(12) United States Patent
Moreton et al.

(10) Patent No.: US 7,466,322 B1
(45) Date of Patent: Dec. 16, 2008

(54) CLIPPING GRAPHICS PRIMITIVES TO THE W=0 PLANE

(75) Inventors: Henry P. Moreton, Woodside, CA (US); Vimal S. Parikh, Fremont, CA (US); Andrew J. Tao, San Francisco, CA (US)

(73) Assignee: NVIDIA Corporation, Santa Clara, CA (US)

( * ) Notice: Subject to any disclaimer, the term of this patent is extended or adjusted under 35 U.S.C. 154(b) by 136 days.

(21) Appl. No.: 11/195,389

(22) Filed: Aug. 2, 2005

(51) Int. Cl.
G09G 5/00 (2006.01)

(52) U.S. Cl. .................. 345/620; 345/623; 345/621

(58) Field of Classification Search ............ 345/621, 345/620, 623
See application file for complete search history.

(56) References Cited

U.S. PATENT DOCUMENTS

| | | | | |
|---|---|---|---|---|
| 4,885,703 | A * | 12/1989 | Deering | 345/422 |
| 5,003,497 | A * | 3/1991 | Priem | 345/419 |
| 5,357,599 | A * | 10/1994 | Luken | 345/627 |
| 6,137,497 | A * | 10/2000 | Strunk et al. | 345/620 |
| 6,169,554 | B1 * | 1/2001 | Deering | 715/764 |
| 6,304,265 | B1 * | 10/2001 | Harris et al. | 345/421 |
| 6,353,439 | B1 | 3/2002 | Lindholm et al. | |
| 6,930,684 | B2 * | 8/2005 | Tjew | 345/451 |
| 2004/0090437 | A1 | 5/2004 | Uesaki et al. | |
| 2005/0190183 | A1 | 9/2005 | Barone et al. | |
| 2005/0231533 | A1 | 10/2005 | Chen | |
| 2005/0275663 | A1 * | 12/2005 | Kokojima et al. | 345/622 |

OTHER PUBLICATIONS

Blinn et al., Clipping Using Homogeneous Coordinates, 1978, ACM SIGGRAPH Computer Graphics, vol. 12, pp. 245-251.*
Blinn et al., A Trip Down the graphics Pipeline: The Homogeneous Perspective Transform, May 1993, IEEE, pp. 75-80.*
Schneider et al., Efficient Polygon Clipping for an SIMD Graphics Pipeline, 1998, IEEE Transactions on Visualization and Computer Graphics, vol. 4, p. 272-285.*
Joy, On-Line Computer Graphics Notes Clipping, Computer Science Department University of California, Davis, pp. 1-16.*
Sutherland, Ivan E., and Gary W. Hodgman, "Reentrant Polygon Clipping," Communications of the ACM, vol. 17, No. 1, pp. 32-42, Jan. 1974.
Olano, Marc, and Trey Greer, "Triangle Scan Conversion Using 2D Homogeneous Coordinates," Proceedings of the 1997 SIGGRAPH/Eurographics Workshop on Graphics Hardware (Los Angeles, CA Aug. 2-4, 1997) ACM SIGGRAPH, New York, 1995.

* cited by examiner

*Primary Examiner*—M Good Johnson
(74) *Attorney, Agent, or Firm*—Patterson & Sheridan, L.L.P.

(57) ABSTRACT

Vertices defining a graphics primitive are converted into homogeneous space and clipped against a single clipping plane, the w=0 plane, to produce a clipped graphics primitive having vertices including w coordinates that are greater than or equal to zero. Rasterizing a graphics primitive having a vertex with a w coordinates that is greater than or equal to zero is less complex than rasterizing a graphics primitive having a vertex with a w coordinate that is less than zero. Clipping against the w=0 plane is less complex than conventional clipping since conventional clipping may require that the graphics primitive be clipped against each of the six faces of the viewing frustum to produce a clipped graphics primitive.

23 Claims, 9 Drawing Sheets

PRIOR ART

Figure 2E clip to +y (y==w) leaves a
vertex with w<0
An additional clip is
necessary

CLIPPING GRAPHICS PRIMITIVES TO THE W=0 PLANE

BACKGROUND OF THE INVENTION

1. Field of the Invention

Embodiments of the present invention generally relate to computer graphics, and more particularly to clipping graphics primitives.

2. Description of the Related Art

Conventional graphics processors are exemplified by systems and methods developed to clip graphics primitives prior to performing setup and rasterization. Although there are some rasterizers that do not require clipping, these rasterizers are more complex than conventional rasterizers and require greater numerical precision to properly rasterize the graphics primitives.

Prior to clipping, each vertex, in object space, represented by coordinates (X,Y,Z) is converted into homogeneous space, resulting in a vertex represented by coordinates (x,y,z,w). Each graphics primitive defined by a set of vertices, e.g., three vertices define a triangle, is clipped by as many as six clipping planes to satisfy the following constraints:

$-w \leq x \leq w$ $-w \leq y \leq w$ $-w \leq z \leq w$.

As a result of this clipping, when the vertices are projected into non-homogeneous space by dividing each vertex by w, each of the projected coordinates (x,y,z) is a value ranging between −1 and 1, inclusive.

Figure 1:
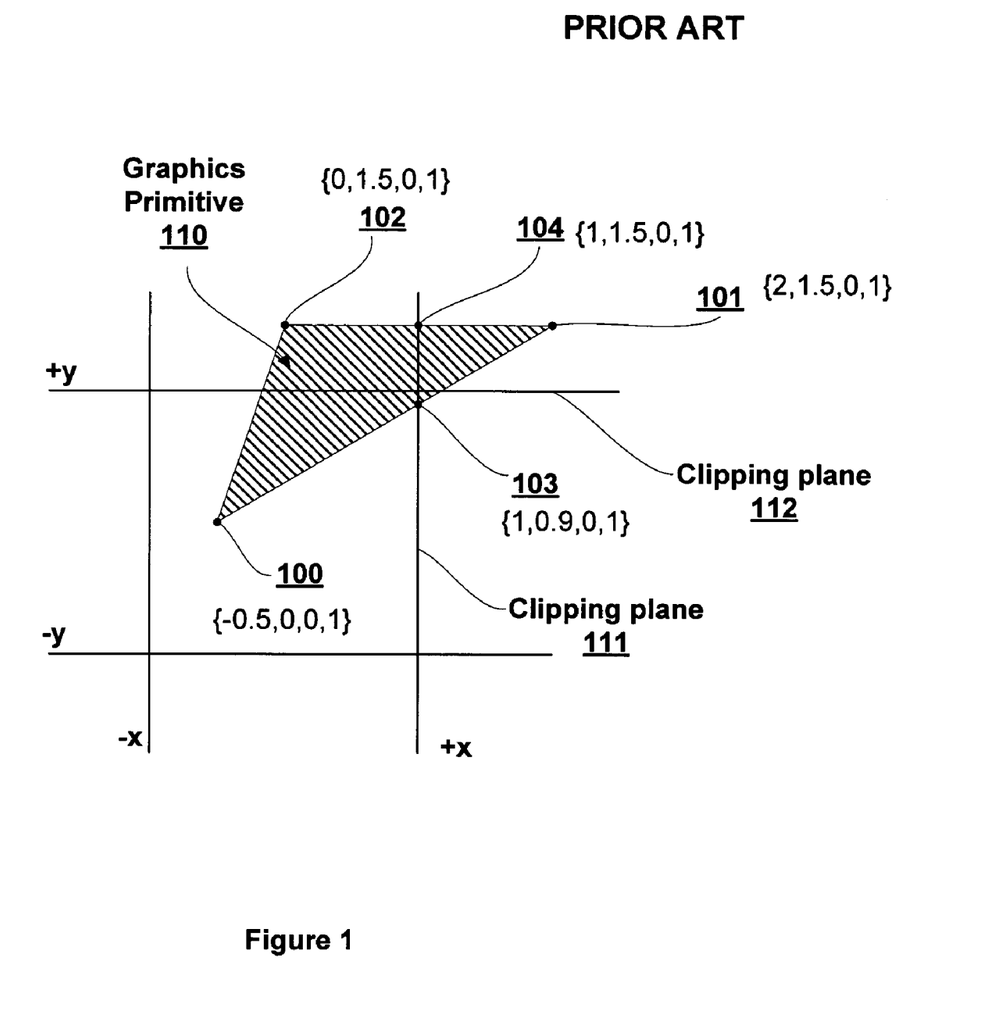
FIG. 1 illustrates a prior art graphics primitive requiring clipping against two clipping planes.

FIG. 1 illustrates a prior art orthographically projected graphics primitive 110 requiring clipping against two clipping planes, a clipping plane 111 corresponding to the +x axis and a clipping plane 112 corresponding to the +y axis. Each graphics primitive may need to be clipped to as many as six clipping planes corresponding to the −x, +x, −y, +y, −z, and +z axes to produce a clipped graphics primitive lying in a volume defined by those axes. Graphics primitive 110 is defined by vertices 100, 101, and 102, corresponding to homogeneous coordinates (−0.5, 0, 0, 1), (2, 1.5, 0, 1), and (0, 1.5, 0, 1), respectively. Vertex 101 is replaced by new vertices 103 and 104, corresponding to homogeneous coordinates (1, 0.9, 0, 1) and (1, 1.5, 0, 1), respectively, when graphics primitive 110 is clipped by clipping plane 111. Graphics primitive 110 is also clipped by clipping plane 112, generating two more new vertices to replace vertex 102 and new vertex 104. Graphics primitive 110 is clipped by two of the six clipping planes. Each clipping operation is computationally intensive, so hardware may only be provided for clipping against one or two clipping planes, causing clipping against more planes to decrease graphics processing performance.

Accordingly, there is a desire to clip graphics primitives prior to rasterization, but to only clip each graphics primitive to a single plane.

SUMMARY OF THE INVENTION

The current invention involves new systems and methods for clipping graphics primitives, specifically clipping graphics primitives to the w=0 plane. Vertices defining a graphics primitive are converted into homogeneous space and clipped against a single clipping plane, the w=0 plane, to produce a clipped graphics primitive. Clipping against the w=0 plane is less complex than conventional clipping since conventional clipping may require that the graphics primitive be clipped against each of the six faces of the viewing frustum. Furthermore, ensuring that all vertices have non-negative w coordinate values simplifies rasterization computations.

Various embodiments of a method of the invention for clipping a graphics primitive, including converting vertices defining the graphics primitive into homogeneous space to produce homogeneous vertices that each include a w coordinate and clipping an edge of the graphics primitive that intersects a w=0 clipping plane to produce a first new vertex with a w coordinate of zero.

Various embodiments of a computer-readable medium containing a program which, when executed by a processor, performs a process of the invention for clipping graphics primitives including converting vertices defining the graphics primitive into homogeneous space to produce homogeneous vertices that each include a w coordinate and clipping an edge of the graphics primitive that intersects a w=0 clipping plane to produce a first new vertex with a w coordinate of zero.

Various embodiments of the invention include a graphics processing system for clipping graphics primitives including a clip unit configured to clip a graphics primitive defined by vertices in homogeneous space against a w=0 plane to produce a clipped graphics primitive.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

When executed by a graphics processor, a vertex program may be used to convert vertices defining a graphics primitive in object space into homogeneous space and clip the graphics primitive against a single clipping plane, the w=0 plane, to produce a clipped graphics primitive. Clipping against the w=0 plane guarantees that all resulting new vertices have w coordinate values equal to 0 (not negative). Furthermore, clipping against the w=0 plane is less complex than conventional clipping since conventional clipping may require that the graphics primitive be clipped against each of the six faces of the viewing frustum.

Figure 2A:
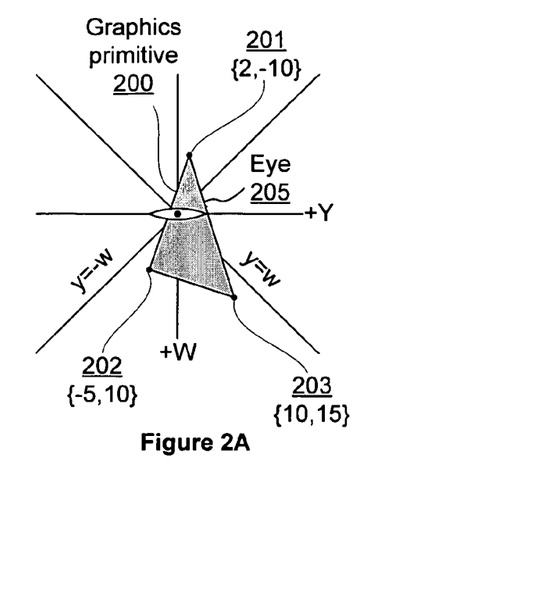
FIGS. 2A, 2B, and 2C illustrate a graphics primitive with a vertex having a negative w coordinate value.

FIG. 2A illustrates a graphics primitive 200 shown in the yw plane with a vertex 201 having a negative w coordinate value of −10. Vertex 201, having a negative w coordinate, lies behind eye 205. The coordinates for each vertex 201, 202, and 203 of graphics primitive 200 are shown in Table 1, where x/w and y/w are the perspective corrected coordinates. Eye 205 is positioned at (0, 0, 0, 0)

TABLE 1

|     | x  | y  | z   | x/w   | y/w   |
|-----|----|----|-----|-------|-------|
| 201 | 0  | 2  | −10 | 0     | −0.2  |
| 202 | −5 | −5 | 10  | −0.5  | −0.5  |
| 203 | 5  | 10 | 15  | 0.333 | 0.666 |

Figure 2B:
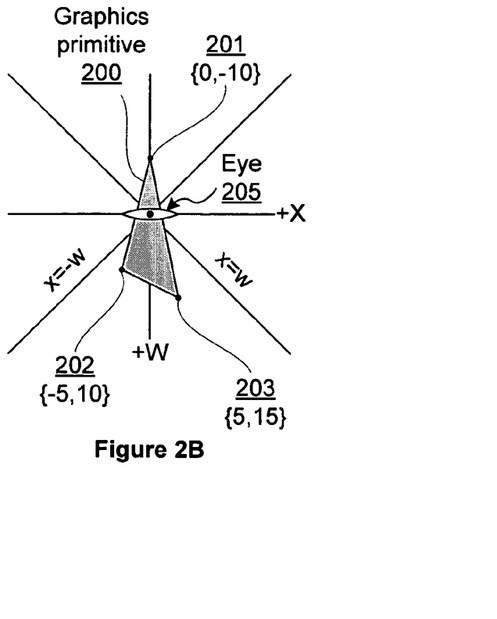
Figure 2C:
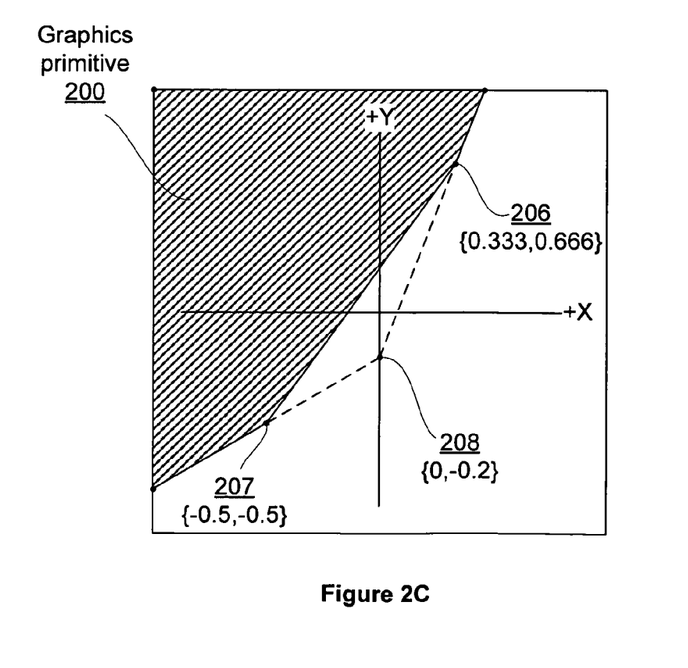

FIG. 2B illustrates graphics primitive 200 shown in the xw plane with vertex 201 having a negative w coordinate value of −10. FIG. 2C illustrates graphics primitive 200 shown in the xy plane from the perspective of eye 205. Vertices 206, 207, and 208 are represented using perspective corrected coordinates and correspond to vertices 201, 202, and 203, respectively. Notice that vertex 208 is positioned behind eye 205 and therefore, the portions of graphics primitive 200 that have w values of less than zero need not be rasterized or shaded. Therefore, graphics primitive 200 should be clipped to the w=0 plane.

Figure 2D:
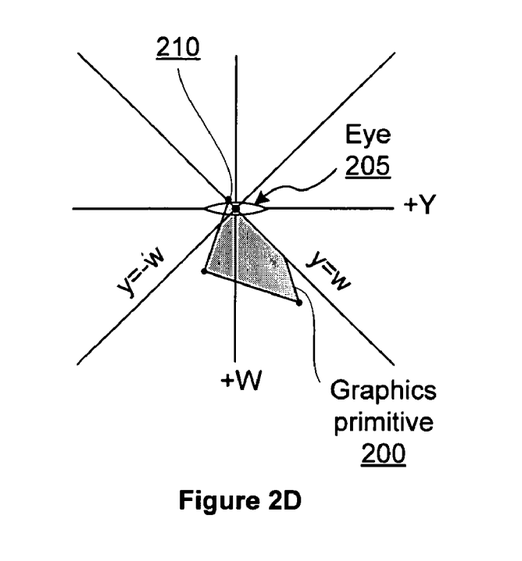
FIGS. 2D and 2E illustrate the graphics primitive shown in FIGS. 2A, B, and C clipped by the y=w plane.
Figure 2E:
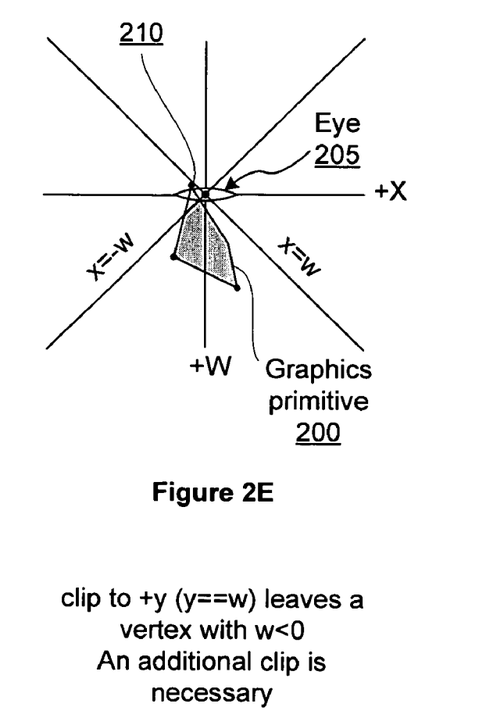

FIG. 2D illustrates graphics primitive 200 shown in FIGS. 2A, B, and C clipped by the y=w plane and shown in the yw plane. A new vertex 210 is produced when graphics primitive 200 is clipped by the y=w plane. Vertex 210 has a w coordinate that is less than zero and lies behind eye 205. An additional clip is necessary to produce a clipped graphics primitive that has only non-negative w coordinate values. FIG. 2E illustrates graphics primitive 200 of FIG. 2D clipped by the y=w plane and shown in the xw plane.

Figure 2F:
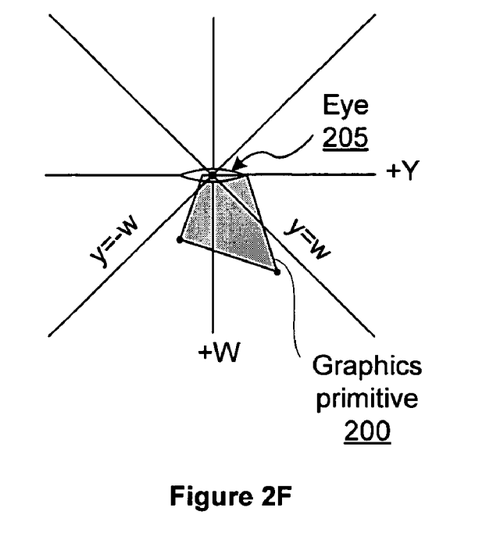
FIGS. 2F and 2G illustrate the graphics primitive shown in FIGS. 2A, B, and C clipped by the w=0 plane, in accordance with one or more aspects of the present invention.
Figure 2G:
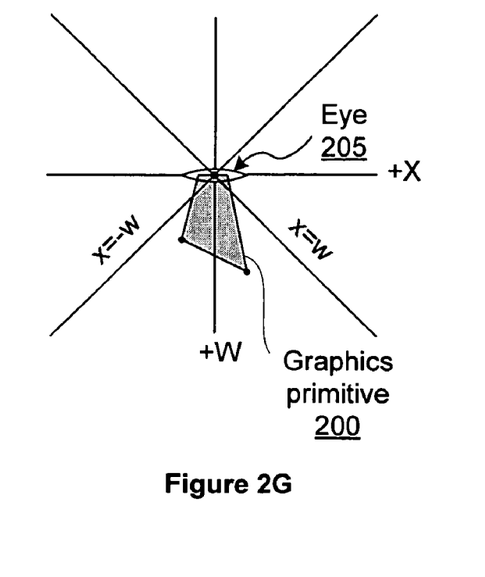

FIG. 2F illustrates graphics primitive 200 shown in FIGS. 2A, B, and C clipped by the w=0 plane and shown in the yw plane, in accordance with one or more aspects of the present invention. Two new vertices are produced when graphics primitive 200 is clipped by the w=0 plane. Each of the new vertices has a w coordinate value of 0, and therefore does not lie behind eye 205. Only a single clip operation is needed to produce a clipped graphics primitive that has only non-negative w coordinate values. FIG. 2G illustrates graphics primi-tive 200 of FIG. 2F clipped by the w=0 plane and shown in the xw plane, in accordance with one or more aspects of the present invention.

Figure 3:
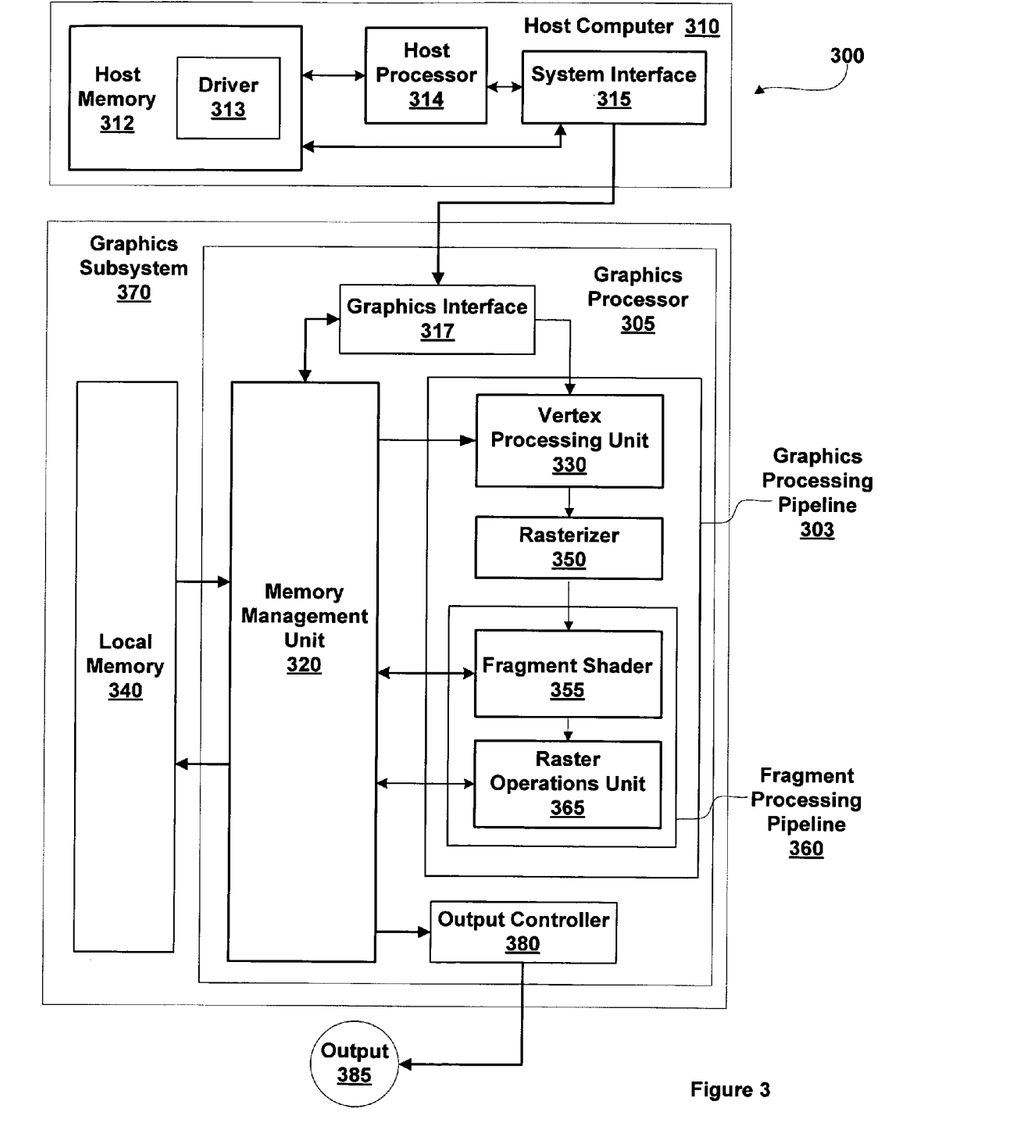
FIG. 3 is a block diagram of an exemplary embodiment of a respective computer system, including a host computer and a graphics subsystem, in accordance with one or more aspects of the present invention.

FIG. 3 is a block diagram of an exemplary embodiment of a respective computer system, including a host computer 310 and a graphics subsystem 370, in accordance with one or more aspects of the present invention. Computing system 300 may be a desktop computer, server, laptop computer, palm-sized computer, tablet computer, game console, portable wireless terminal such as a PDA (personal digital assistant) or cellular telephone, computer based simulator, or the like. Host computer 310 includes host processor 314 that may include a system memory controller to interface directly to host memory 312 or may communicate with host memory 312 through a system interface 315. System interface 315 may be an I/O (input/output) interface or a bridge device including the system memory controller to interface directly to host memory 312. An example of system interface 315 known in the art includes Intel® Northbridge.

Vertex and shader program instructions for execution by a programmable graphics processor 305 may be stored in host memory 312 or in a local memory 340. A graphics device driver, driver 313, interfaces between processes executed by host processor 314, such as application programs and shader programs, and a programmable graphics processor 305, translating program instructions as needed for execution by programmable graphics processor 305.

Graphics subsystem 370 includes local memory 340 and programmable graphics processor 305. Host computer 310 communicates with graphics subsystem 370 via system interface 315 and a graphics interface 317 within programmable graphics processor 205. Data, program instructions, and commands received at graphics interface 317 can be passed to a graphics processing pipeline 303 or written to a local memory 340 through memory management unit 320. Programmable graphics processor 305 uses memory to store graphics data, including texture maps, and program instructions, where graphics data is any data that is input to or output from computation units within programmable graphics processor 305. Graphics memory is any memory used to store graphics data or program instructions to be executed by programmable graphics processor 305. Graphics memory can include portions of host memory 312, local memory 340 directly coupled to programmable graphics processor 305, storage resources coupled to the computation units within programmable graphics processor 305, and the like. Storage resources can include register files, caches, FIFOs (first in first out memories), and the like.

In addition to graphics interface 317, programmable graphics processor 305 includes a graphics processing pipeline 303, a memory management unit 320 and an output controller 380. Data and program instructions received at graphics interface 317 can be passed to a vertex processing unit 330 within graphics processing pipeline 303 or written to local memory 340 through memory management unit 320. In addition to communicating with local memory 340, and graphics interface 317, memory management unit 320 also communicates with graphics processing pipeline 303 and output controller 380 through read and write interfaces in graphics processing pipeline 303 and a read interface in output controller 380.

Within graphics processing pipeline 303, vertex processing unit 330 and a programmable graphics fragment processing pipeline, fragment processing pipeline 360, perform a variety of computational functions. Some of these functions are table lookup, scalar and vector addition, multiplication, division, coordinate-system mapping, calculation of vector normals, tessellation, calculation of derivatives, interpolation, filtering, and the like. Vertex processing unit 330 and fragment processing pipeline 360 are optionally configured such that data processing operations are performed in multiple passes through graphics processing pipeline 303 or in multiple passes through fragment processing pipeline 360. Each pass through programmable graphics processor 305, graphics processing pipeline 303 or fragment processing pipeline 360 concludes with optional processing by a raster operations unit 365.

Vertex programs are sequences of vertex program instructions compiled by host processor 314 for execution within vertex processing unit 330 and rasterizer 350. Shader programs are sequences of shader program instructions compiled by host processor 314 for execution within fragment processing pipeline 360. Vertex processing unit 330 receives a stream of program instructions (vertex program instructions and shader program instructions) and data from interface 317 or memory management unit 320, and performs vector floating-point operations or other processing operations using the data. Vertex processing unit 330 includes a viewport transform and clip unit, described in conjunction with FIG. 5A, that operates on primitives, performing operations to clip the graphics primitives to the w=0 plane.

The program instructions configure subunits within vertex processing unit 330, rasterizer 350 and fragment processing pipeline 360. The program instructions and data are stored in graphics memory, e.g., portions of host memory 312, local memory 340, or storage resources within programmable graphics processor 305. When a portion of host memory 312 is used to store program instructions and data, the portion of host memory 312 can be uncached so as to increase performance of access by programmable graphics processor 305. Alternatively, configuration information is written to registers within vertex processing unit 330, rasterizer 350 and fragment processing pipeline 360 using program instructions, encoded with the data, or the like.

Data processed by vertex processing unit 330 and program instructions are passed from vertex processing unit 330 to a rasterizer 350. Rasterizer 350 is a sampling unit that processes primitives, including clipped graphics primitives, and generates sub-primitive data, such as fragment data, including parameters associated with fragments (texture identifiers, texture coordinates, and the like). Rasterizer 350 converts the primitives into sub-primitive data by performing scan conversion on the data processed by vertex processing unit 330. When primitives include vertices that have w coordinate values that are less than zero, the computations performed by rasterizer 350 are more complex compared with computations for vertices with w coordinate values that are greater than or equal to w, i.e., clipped by the w=0 plane. Rasterizer 350 outputs fragment data and shader program instructions to fragment processing pipeline 360.

The shader programs configure the fragment processing pipeline 360 to process fragment data by specifying computations and computation precision. Fragment shader 355 is optionally configured by shader program instructions such that fragment data processing operations are performed in multiple passes within fragment shader 355. Fragment shader 355 may be configured to perform anisotropic or isotropic texture mapping and produce filtered texels. The fragment data and filtered texels are processed by fragment shader 355 to produce shaded fragment data.

Fragment shader 355 outputs the shaded fragment data, e.g., color and depth, and codewords generated from shader program instructions to raster operations unit 365. Raster operations unit 365 includes a read interface and a write interface to memory controller 320 through which raster operations unit 365 accesses data stored in local memory 340 or host memory 312. Raster operations unit 365 optionally performs near and far plane clipping and raster operations, such as stencil, z test, blending, and the like, using the fragment data and pixel data stored in local memory 340 or host memory 312 at a pixel position (image location specified by x,y display coordinates) associated with the processed fragment data. Raster operations unit 365 may also perform x and y clipping, but does not generate fragments outside of the region to be displayed. The output data from raster operations unit 365 is written back to local memory 340 or host memory 312 at the pixel position associated with the output data and the results, e.g., image data are saved in graphics memory.

When processing is completed, an output 385 of graphics subsystem 370 is provided using output controller 380. Alternatively, host processor 314 reads the image stored in local memory 340 through memory management unit 320, graphics interface 317 and system interface 315. Output controller 380 is optionally configured by opcodes to deliver data to a display device, network, electronic control system, other computing system 300, other graphics subsystem 370, or the like.

Figure 4:
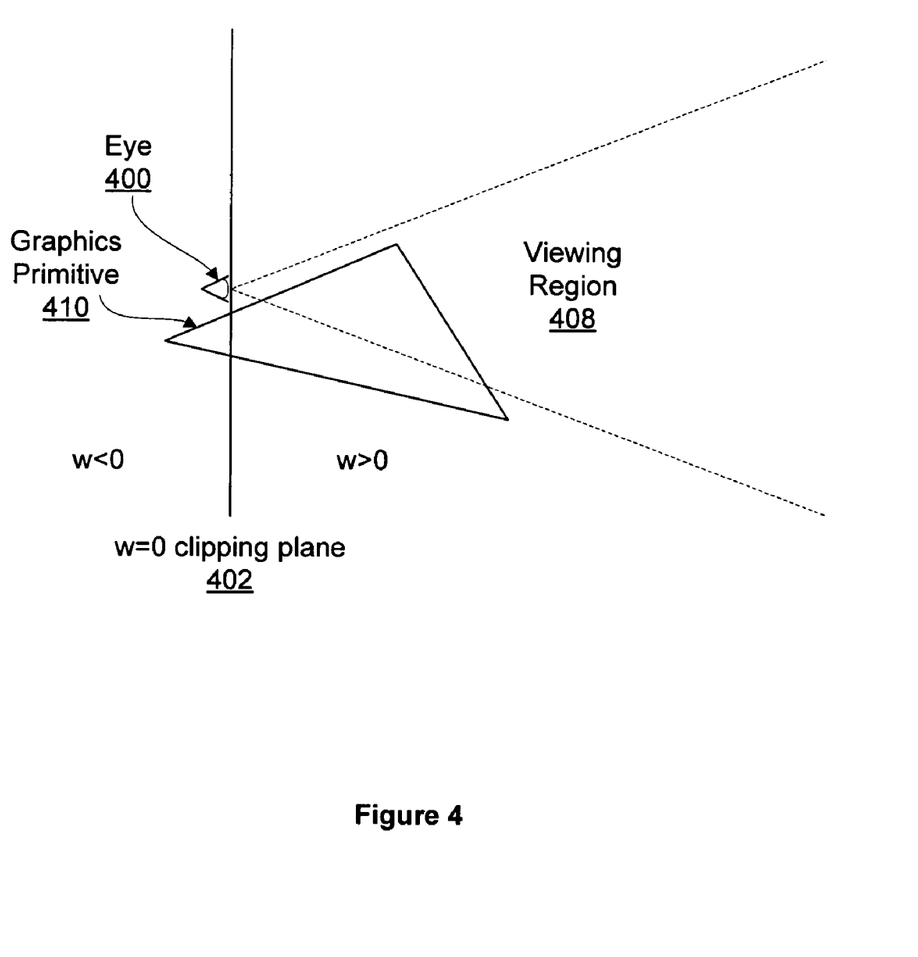
FIG. 4 illustrates the w=0 clipping plane in accordance with one or more aspects of the present invention.

Vertex processing unit 330 receives vertex program instructions and graphics primitives, e.g. triangles, quadrilaterals, polygons, or the like. Prior to clipping, each vertex represented by position coordinates (X,Y,Z) is converted into homogeneous space, resulting in a vertex represented by coordinates (x,y,z,w). FIG. 4 illustrates a graphics primitive 410 and a w=0 clipping plane 402 in homogeneous space in accordance with one or more aspects of the present invention. The w=0 clipping plane 402 is positioned at a viewpoint, eye 400 defining a viewing region 408. Graphics primitives and portions of graphics primitives lying outside of the viewing region 408 will not be visible in an image produced from eye 400's perspective. A w>0 region lies to the right of w=0 clipping plane 402 and a w<0 region lies to the left of w=0 clipping plane 402. The portion of graphics primitive 410 that is within the w<0 region will be clipped by w=0 clipping plane 402, as described in conjunction with FIGS. 5 and 6, generating two new vertices to produce a clipped graphics primitive. Further clipping may be required to clip to other clip planes and is performed by rasterizer 350.

Figure 5A:
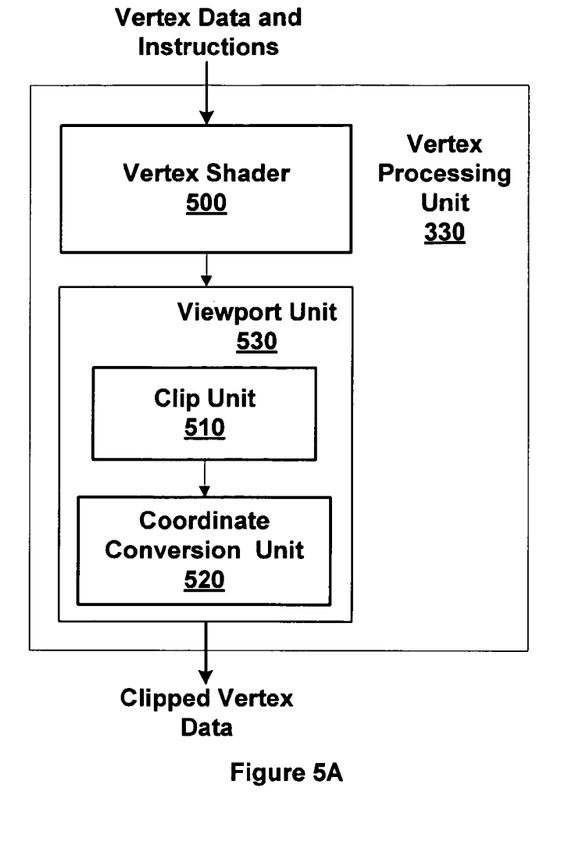
FIG. 5A is a block diagram of an exemplary embodiment of the vertex processing unit from FIG. 3 in accordance with one or more aspects of the present invention.

FIG. 5A is a block diagram of an exemplary embodiment of vertex processing unit 330 from FIG. 3 in accordance with one or more aspects of the present invention. Vertex processing unit 330 includes a vertex shader 500 and a viewport unit 530. Vertex shader 500 receives the vertex program instructions and graphics primitives and operates on the vertices of each graphics primitive. Specifically, vertex shader 500 may be configured to perform custom transform and lighting operations on vertices including modifying position and other parameters such as color, texture coordinates, specularity, or the like. Vertices may be scaled, rotated, or translated, for example a vertex may be transformed from object space to homogeneous space. A vertex shader program may be used to perform custom transform and lighting operations for complex character animation, environmental effects, procedural deformation, morphing, motion blur, lens effects, two-sided lighting, or the like. Vertex shader 500 outputs processed vertices that define graphics primitives and vertex program instructions to viewport unit 530. The processed vertices output by vertex shader 500 may be represented in object space or in homogeneous space.

Figure 7A:
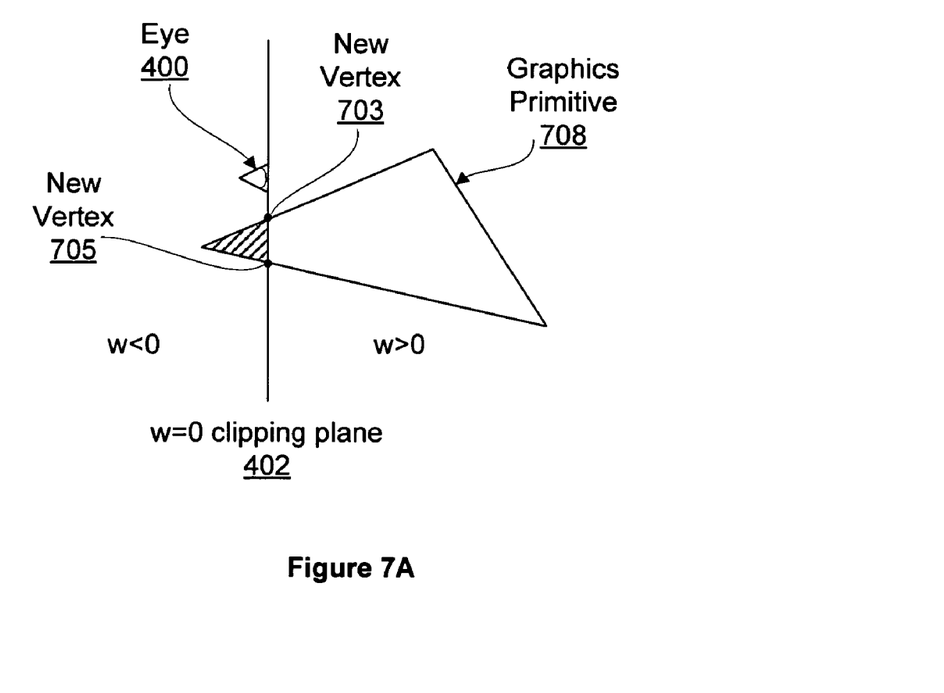
FIGS. 7A, and 7B illustrate examples of clipping graphics primitives with the w=0 clipping plane in accordance with one or more aspects of the present invention.
Figure 7B:
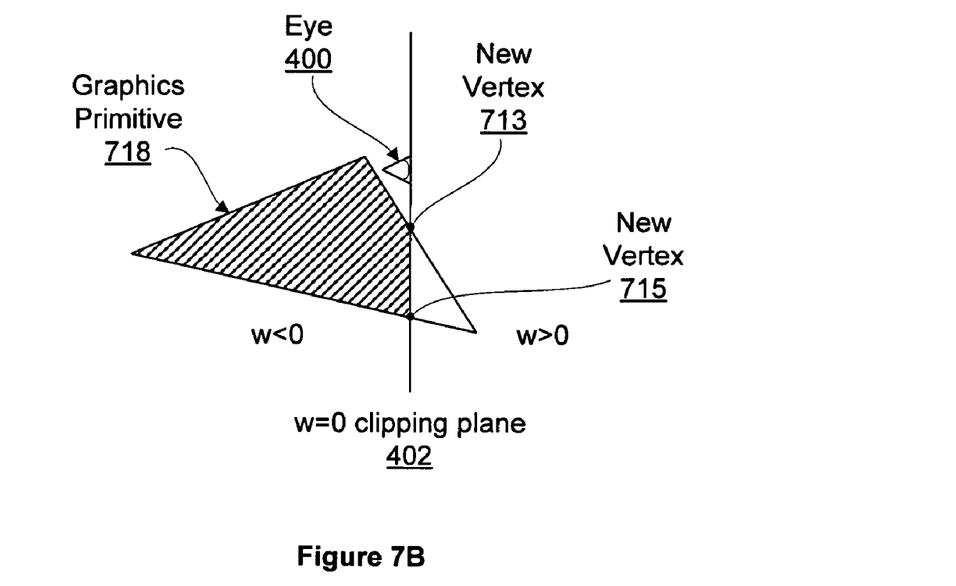

In some embodiments of the present invention, vertex shader 500 operates on vertices in homogeneous space and viewport unit 530 converts the vertices from homogeneous space to screen space. Viewport unit 530 includes a clip unit 510 and a coordinate conversion unit 520. Clip unit 510 is configured to clip the graphics primitives against the w=0 plane so that all vertices have a w value that is greater than or equal to 0, as shown in FIGS. 7A and 7B.

Figure 5B:
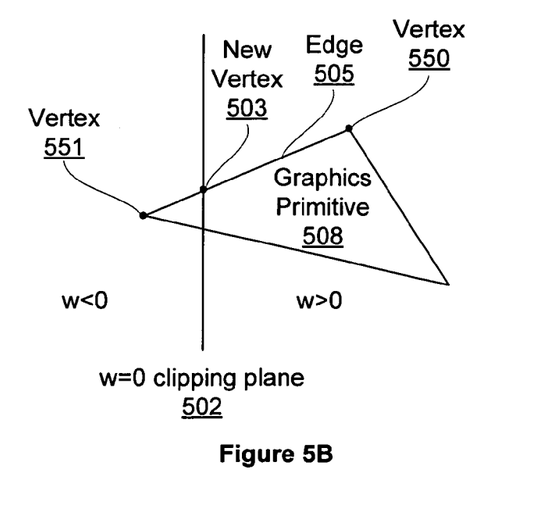
FIG. 5B illustrates clipping an edge of a graphics primitive with the w=0 clipping plane in accordance with one or more aspects of the present invention.

FIG. 5B illustrates clipping an edge 505 of a graphics primitive 508 with a w=0 clipping plane 502 in accordance with one or more aspects of the present invention. Each edge of a graphics primitive, such as edge 505 of graphics primitive 508, is described parametrically as $$(1-t)P_0+tP_1,$$

where $P_0$ and $P_1$ are vertices, such as vertices 550 and 551, each of which is represented by homogeneous coordinates (x,y,z,w). In order to determine the coordinates of a new vertex coincident with w=0 clipping plane 502, such as new vertex 503, the edge equation representing the w coordinate is solved for t when w=0:

$$(1-t)P_{0w}+tP_{1w}=0$$

$$t=P_{0w}/(P_{0w}-P_{1w}).$$

Once the value of t has been determined for an edge, the homogeneous coordinates, (x,y,z,0), of the new vertex along the clipped edge may be computed using the following equations for each of the other coordinates:

$$x=(1-t)P_{0x}+tP_{1x},$$

$$y=(1-t)P_{0y}+tP_{1y}, \text{ and}$$

$$z=(1-t)P_{0z}+tP_{1z}.$$

In some embodiments of the present invention, the homogeneous coordinates of the vertices and new vertices may be represented in a floating point data format.

In contrast, when conventional clipping is used to clip a graphics primitive against a frustum face, the following, more complex, equation is solved:

$$(1-t)P_{0x}+tP_{1x}=(1-t)P_{0w}+tP_{1w}$$

$$t=(P_{0x}-P_{0w})/((P_{1w}-P_{0w})+(P_{0x}-P_{1x})).$$

Therefore, clipping graphics primitives using the w=0 plane is mathematically simpler than performing conventional clipping even against one frustum face. Furthermore, a graphics primitive is only clipped against a single plane to eliminate vertices with w coordinates that are less than zero. In contrast, when conventional clipping is used, each graphics primitive may be clipped against as many as six frustum faces.

Coordinate conversion unit 520 receives clipped graphics primitives from clip unit 510. Some clipped graphics primitives may not require clipping and are output by clip unit 510 unmodified, while other graphics primitives are clipped and two new vertices are produced. Coordinate conversion unit 520 divides the x,y, and z homogeneous coordinates by w to produce non-homogeneous coordinates (x/w,y/w,z/w,1) for each vertex. Coordinate conversion unit 520 may be configured to scale the non-homogeneous vertex coordinates by a viewport scale and add a viewport offset. Coordinate conversion unit 520 may also be configured using vertex program instructions to translate the clipped vertices into screen space. Coordinate conversion unit 520 outputs clipped vertex data representing the clipped graphics primitives.

Figure 6:
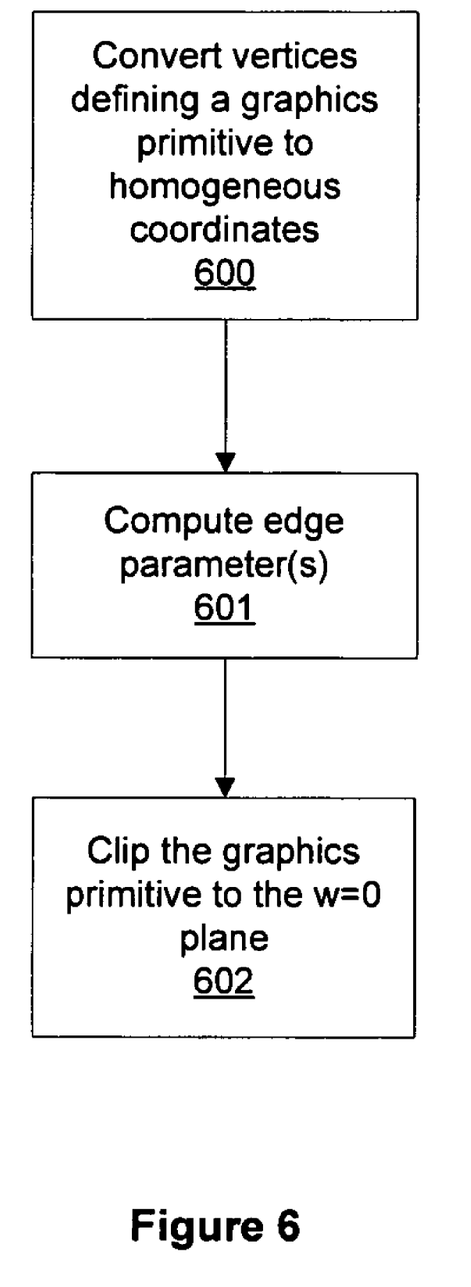
FIG. 6 illustrates an embodiment of a method for clipping graphics primitives using the w=0 clipping plane in accordance with one or more aspects of the present invention.

FIG. 6 illustrates an embodiment of a method for clipping graphics primitives using the w=0 clipping plane in accordance with one or more aspects of the present invention. In step 600 vertices defining a graphics primitive are converted into homogeneous coordinates within either vertex shader 500 or viewport unit 530. In step 601 clip unit 610 is configured to compute the edge parameter, t, for each edge of the graphics primitive that intersects the w=0 clipping plane. Because a single plane is used to clip the graphics primitive, either no edges or two edges may intersect the w=0 clipping plane. In step 602 clip unit 510 is configured to clip the graphics primitive to the w=0 plane producing two new vertices, each with a w value of 0.

FIG. 7A illustrates an example of clipping a graphics primitive 708 with the w=0 clipping plane 402 in accordance with one or more aspects of the present invention. As previously described in conjunction with FIG. 4, the w=0 clipping plane 402 coincides with eye 400. The w=0 clipping plane 402 intersects two edges of graphics primitive 708. Using the method described in conjunction with FIG. 6, an edge parameter t is computed for each of the edges and used to compute homogeneous coordinates for new vertex 703 and new vertex 705. The shaded portion of graphics primitive 708, within the w<0 region, is removed by the clipping operation.

FIG. 7B illustrates an example of clipping a graphics primitive 718 with the w=0 clipping plane 402 in accordance with one or more aspects of the present invention. As previously described in conjunction with FIG. 4, the w=0 clipping plane 402 coincides with eye 400. The w=0 clipping plane 402 intersects two edges of graphics primitive 708. Using the method described in conjunction with FIG. 6, an edge parameter t is computed for each of the edges and used to compute homogeneous coordinates for new vertex 713 and new vertex 715. The shaded portion of graphics primitive 718, within the w<0 region, is removed by the clipping operation.

While the foregoing is directed to embodiments of the present invention, other and further embodiments of the invention may be devised without departing from the basic scope thereof, and the scope thereof is determined by the claims that follow. The foregoing description and drawings are, accordingly, to be regarded in an illustrative rather than a restrictive sense. The listing of steps in method claims do not imply performing the steps in any particular order, unless explicitly stated in the claim.

All trademarks are the respective property of their owners.

The invention claimed is:

1. A method of clipping a graphics primitive, comprising:
converting vertices defining the graphics primitive into homogeneous space to produce homogeneous vertices that each include a w coordinate; and
clipping an edge of the graphics primitive using a single clipping plane in homogeneous space to produce a first new vertex with a w coordinate of zero, wherein the single clipping plane is a w=0 clipping plane, wherein the first new vertex is used to produce one or more shaded pixels for display.

2. The method of claim 1, wherein the clipping includes computing an edge parameter that is computed as a w value of a first vertex of the graphics primitive divided by the difference between the w value and a w value of a second vertex of the graphics primitive.

3. The method of claim 2, further comprising computing a coordinate of the first new vertex as the sum of a first product and a second product, wherein the first product is a value of the coordinate for the first vertex of the graphics primitive and a difference between one and the edge parameter and the second product is a value of the coordinate for the second vertex of the graphics primitive and the edge parameter.

4. The method of claim 2, further comprising computing another coordinate of the first new vertex using the edge parameter.

5. The method of claim 1, further comprising clipping another edge of the graphics primitive that intersects the w=0 clipping plane to produce a second new vertex with a w coordinate of zero.

6. The method of claim 5, further comprising rasterizing a clipped graphics primitive defined by the first new vertex, the second new vertex, and one of the homogeneous vertices of the graphics primitive.

7. The method of claim 1, wherein coordinates of the new first vertex are represented in a floating point format.

8. The method of claim 1, wherein, after clipping the edge of the graphics primitive, the w coordinate for each of the homogeneous vertices, including the first new vertex, is greater than or equal to zero.

9. A computer-readable medium containing a program which, when executed by a processor, performs a process for clipping graphics primitives, the process comprising:
    converting vertices defining the graphics primitive into homogeneous space to produce homogeneous vertices that each include a w coordinate; and
    clipping an edge of the graphics primitive using a single clipping plane in homogeneous space to produce a first new vertex with a w coordinate of zero, wherein the single clipping plane is a w=0 clipping plane.

10. The computer-readable medium of claim 9, wherein the clipping includes computing an edge parameter that is computed as a w value of a first vertex of the graphics primitive divided by the difference between the w value and a w value of a second vertex of the graphics primitive.

11. The computer-readable medium of claim 10, wherein the process further comprises computing a coordinate of the first new vertex as the sum of a first product and a second product, wherein the first product is a value of the coordinate for the first vertex of the graphics primitive and a difference between one and the edge parameter and the second product is a value of the coordinate for the second vertex of the graphics primitive and the edge parameter.

12. The computer-readable medium of claim 9, wherein the process further comprises clipping another edge of the graphics primitive that intersects the w=0 clipping plane to produce a second new vertex with a w coordinate of zero.

13. The computer-readable medium of claim 12, wherein the process further comprises rasterizing a clipped graphics primitive defined by the first new vertex, the second new vertex, and one of the homogeneous vertices of the graphics primitive.

14. The computer-readable medium of claim 9, wherein coordinates of the new first vertex are represented in a floating point format.

15. The method of claim 9, wherein, after clipping the edge of the graphics primitive, the w coordinate for each of the homogeneous vertices, including the first new vertex, is greater than or equal to zero.

16. A system for clipping graphics primitives, comprising a clip unit configured to clip a graphics primitive defined by vertices in homogeneous space against a single clipping plane in homogeneous space to produce a clipped graphics primitive, wherein the single clipping plane is a w=0 plane.

17. The system of claim 16, wherein the clip unit is configured to clip two edges of the graphics primitive to produce a first new vertex and a second new vertex, each new vertex having a w value of zero.

18. The system of claim 17, further comprising a coordinate conversion unit configured to divide the coordinates of the first new vertex by w to produce non-homogeneous coordinates corresponding to the first new vertex.

19. The system of claim 17, wherein coordinates of the new first vertex are represented in a floating point format.

20. The system of claim 16, further comprising a rasterizer configured to process the clipped graphics primitive to produce fragment data corresponding to one or more pixels.

21. The system of claim 20, wherein the clip unit is included within a programmable graphics processor, the programmable graphics processor comprising:
    a vertex shader configured to perform custom transformation and lighting operations on the vertices and provide the vertices in homogeneous space defining the graphics primitive to the clip unit; and
    a coordinate conversion unit configured to divide coordinates of a vertex of the clipped graphics primitive by w to produce non-homogeneous coordinates corresponding to the vertex.

22. The system of claim 16, further comprising a vertex shader configured to perform custom transformation and lighting operations on the vertices and provide the vertices in homogeneous space defining the graphics primitive to the clip unit.

23. The method of claim 16, wherein, after clipping the graphics primitive defined by vertices in homogeneous space, a w coordinate for each of the homogeneous vertices is greater than or equal to zero.

* * * * *